United States Patent
Clark et al.

(10) Patent No.: US 8,090,685 B2
(45) Date of Patent: Jan. 3, 2012

(54) KNOWLEDGE BASED SYNCHRONIZATION OF SUBSETS OF DATA WITH NO MOVE CONDITION

(75) Inventors: Michael Ray Clark, Redmond, WA (US); Lev Novik, Bellevue, WA (US); Moe Khosravy, Kirkland, WA (US); Oliver C. Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 11/855,490

(22) Filed: Sep. 14, 2007

(65) Prior Publication Data

US 2009/0077002 A1 Mar. 19, 2009

(51) Int. Cl.
*G06F 7/06* (2006.01)
(52) U.S. Cl. ................................... 707/612
(58) Field of Classification Search ........... 707/613, 707/614, 617, 612, 623, 629, 610
See application file for complete search history.

(56) References Cited

U.S. PATENT DOCUMENTS

| | | | |
|---|---|---|---|
| 5,787,262 A | 7/1998 | Shakib et al. | |
| 5,991,771 A | 11/1999 | Falls et al. | |
| 6,505,214 B1 | 1/2003 | Sherman et al. | |
| 6,615,223 B1 | 9/2003 | Shih et al. | |
| 6,636,897 B1 | 10/2003 | Sherman et al. | |
| 6,678,882 B1 | 1/2004 | Hurley et al. | |
| 6,944,642 B1 | 9/2005 | Hopmann et al. | |
| 7,024,430 B1 | 4/2006 | Ingraham et al. | |
| 7,146,385 B1 | 12/2006 | Bruce | |
| 7,216,133 B2 | 5/2007 | Wu et al. | |
| 2003/0069759 A1 | 4/2003 | Smith | |
| 2003/0093435 A1* | 5/2003 | Bandekar | 707/103 R |
| 2005/0027755 A1* | 2/2005 | Shah et al. | 707/201 |
| 2005/0177617 A1 | 8/2005 | Banginwar et al. | |
| 2006/0215569 A1 | 9/2006 | Khosravy et al. | |
| 2006/0242443 A1* | 10/2006 | Talius et al. | 713/400 |
| 2006/0277224 A1* | 12/2006 | Aftab et al. | 707/201 |
| 2007/0067349 A1* | 3/2007 | Jhaveri et al. | 707/200 |
| 2007/0088764 A1* | 4/2007 | Yoon et al. | 707/201 |
| 2007/0094471 A1* | 4/2007 | Shaath et al. | 711/163 |

OTHER PUBLICATIONS

International Search Report and Written Opinion mailed Feb. 27, 2009 for PCT Application No. PCT/US2008/076259, 10 pages.
"Sync Services Programming Guide", Apple, Inc., Mar. 8, 2006, 68 pages. http://developer.apple.com/documentation/Cocoa/Conceptual/SyncServices/SyncServices.pdf.
"The Multimaster Synchronization Provider", https://www.opends.org/wiki//page/TheMultimasterSynchronizationProvider. Last accessed on Sep. 4, 2007, 1 page.

(Continued)

*Primary Examiner* — James Trujillo
*Assistant Examiner* — Soheila Davanlou

(57) ABSTRACT

An efficient way is provided to represent and exchange knowledge and/or partial knowledge across nodes when synchronizing between any two nodes. A first node sends a second node its knowledge and/or partial knowledge, including objects and versions of those objects. The second node compares its knowledge and/or partial knowledge with the knowledge and/or partial knowledge of the first node, and then sends the first node any latest versions of objects of which the first node is unaware. In addition, the second node sends its knowledge and/or partial knowledge to the first node. The first node then performs a similar object-by-object version comparison to determine any conflicts due to independent evolution of objects and any changes that should be sent to the second node in order to bring the objects of the second node up to date with the knowledge and/or partial knowledge of the first node.

20 Claims, 16 Drawing Sheets

OTHER PUBLICATIONS

Thomas Schwotzer, et al. "Shark—a System for Management, Synchronization and Exchange of Knowledge in Mobile User Groups", Journal of Universal Computer Science, vol. 8, No. 6, (2002), 644-651, submitted Apr. 2, 2002, accepted Mar. 5, 2002, appeared Jun. 28, 2002. http://www.jukm.org/jucs_8_6/shark_a_system_for/Schwotzer_T.pdf.

CN OA dated May 11, 2011 for Chinese Application No. 200880107306.X, 7 pages.

* cited by examiner $F_A$ [Name, Address, Phone]:   A15   B35   C25   E30

$F_B$ [Name, Address, Email]:   A45   B25   C30   D16

*Combine $F_A$ and $F_B$*

Result 800 of Combining Filters $F_A$ and $F_B$ (Version Maximums for each Filter Component)

| | | | | | |
|---|---|---|---|---|---|
| Name 801 | A45 | B35 | C30 | D16 | E30 |
| Address 802 | A45 | B35 | C30 | D16 | E30 |
| Phone 803 | A45 | B35 | C30 | | A45 |
| Email 804 | A45 | B35 | C30 | D16 | |

FIG. 8

KNOWLEDGE BASED SYNCHRONIZATION OF SUBSETS OF DATA WITH NO MOVE CONDITION

TECHNICAL FIELD

The subject disclosure relates to knowledge based multi-master synchronization of subsets of data among applications and devices where data cannot be moved into or out of the subsets.

BACKGROUND

There are a variety of distributed data systems that have devices and objects that share data with one another. For instance, music sharing systems may synchronize music between a PC, a Cell phone, a gaming console and an MP3 player. Email data may be synchronized among a work server, a client PC, and a portable email device. Today, to the extent such devices synchronize according to common information, the synchronization takes place according to a static setup among the devices. However, when these devices are loosely coupled such that they may become disconnected from communications with each other, e.g., when a Cell phone is in a tunnel, or when the number of devices to be synchronized is dynamic, it is desirable to have a way for the devices to determine what changes each other device needs when they re-connect to one another, or as they join the network.

Today, as shown in FIG. 1, there are various examples where a master node 100 synchronizes in a dedicated manner with a client node 110, such as when an email server synchronizes with an email client. Due to the dedicated synchronization between the two devices, the state of the necessary knowledge 102 to synchronize between the two devices can be tracked by the master node 100. Such knowledge 102 can also optionally be tracked by client node 100 as well, however, when the connection between master node 100 and client node 110 becomes disconnected at times, and when the number of synchronizing devices increases, tracking the necessary knowledge across all of those devices and representing it efficiently at the same time becomes a difficult problem.

In addition to being inefficient and inflexible, another problem with current solutions is that they often base their synchronization semantics solely on clocks or logical watermarks for a specific node (e.g., the email server), as opposed to any node. These systems can work well in cases of a single connecting node or master. However, they run into problems when the topology or pattern in which the nodes connect changes unpredictably.

Thus, a need for node-independent synchronization knowledge arises when computers in a topology change the way they connect to each other or as the number of computers grows. For instance, with a media player, it might be desirable to synchronize among multiple computers and multiple websites. In most instances, most applications can only synchronize data between a few well-known endpoints (home pc and media player). As the device community evolves over time for a user of the media player application, however, the need for data synchronization flexibility for the music library utilized by the devices increases, thereby creating the need for a more robust system.

Thus, loosely connected systems of device nodes need an efficient way to describe the data they have, where they received the data and what data they need from another node involved in the conversation. Any distributed data system that wishes to share common information across multiple loosely coupled devices could thus benefit from a way to represent what changes to the common information of which they are aware and what changes of which they are unaware.

In this regard, complications arise when attempting to synchronize among loosely coupled devices when there is no mechanism for understanding the collective knowledge of the set of devices that are connected. Compounding the problem of how to represent knowledge efficiently in a synchronization framework is the problem of how to synchronize and represent only a subset of information known by other device(s). For instance, this might happen where a device or application is not capable of storing or using the same types, formats, or amounts of data that a second device stores or uses, i.e., different endpoints can have different capabilities. For instance, a first device might be a personal computer (PC) with lots of storage, whereas a handheld device that synchronizes with the PC may have limited storage. In such case, the handheld device may only receive a subset of the files from the PC, e.g., only those files on the PC that are 50 Kb or less. How to represent on the handheld device in a loosely coupled multi-master synchronization environment that the handheld device received a subset of knowledge from the PC is a challenge.

This subset synchronization scenario can also manifest for different devices that have identical or similar capabilities, but where the different devices nonetheless maintain different schema for representing data elements to be synchronized. For instance, a first device might store music files with a rich set of metadata, such as title, artist, album, size of file, length in time, rating, format, digital rights management, etc., whereas a second device, though having the same rendering and memory capabilities, may include a different application that only stores title, artist and album. In this case, the second device indeed would only carry over a subset of information to its data store when synchronizing with the first device.

The same subset synchronization complication also applies when the data to be synchronized from the first device to the second device is not strictly a subset of the data on the first device. For instance, in the case of overlapping, but different sets of schema elements maintained by each device, even though the first device has schema elements not represented by the second device, and the second device has schema elements not represented by the first device, there is a common overlapping set of schema elements represented by both devices. Thus, the two devices can still benefit by sharing what they know about each other's common or overlapping set of data, in which case each device is really sharing a subset of its own data with the other device. Today, however, for loosely coupled devices in a multi-master system, there is no efficient and flexible way to represent this partial knowledge share as such.

Instead of representing partial knowledge synchronization as such, today, conventional systems select the lowest common denominator among devices in terms of their synchronization capabilities. Thus, if a first device can represent data of types A, B, C, D, E and F, a second device can represent data of types A, G, H, I and J and a third device can represent data of types A, K, L, M and N, then the least common denominator of data types supported among the three devices is type A only. In such case, only type A would be synchronized in conventional synchronization systems.

Moreover, while the data of type A can be synchronized among the devices as the lowest common denominator, today, there is also no dialog among the devices beyond the synchronized data itself that indicates it was a partial knowledge share. In essence, tracking how knowledge evolves in a multi-master synchronization system where devices come and go, connect and disconnect, and tracking how subsets of data are exchanged among the devices in such a system is a difficult and challenging problem thus far unaddressed by those in the synchronization field.

Still further, other conventional systems in essence ignore the problem by allowing the full set of knowledge on each device to synchronize to each of the other devices. Where a device does not recognize the data that was synchronized to its data store, the device marks the data as unrecognizable. While this allows a third device to synchronize with the unrecognizable data on the second device, potentially giving the third device an opportunity to recognize some or all of the unrecognizable data, the proliferation of unrecognizable data on devices with limited storage is unworkable as a practical matter. More generally, storing all of the data in this fashion achieves nothing more than a backup system where each device backs up its data to all other devices of a network, an incredibly inefficient scheme to say the least.

Accordingly, flexible and efficient ways to represent knowledge transfers from one device to another device are desired for a variety of loosely coupled devices, where the device transfers only a subset of its knowledge to the other device. Additional detail about these and other deficiencies in the current state of synchronization among loosely coupled devices, and with respect to synchronizing only a subset of data among the devices, may become apparent from the description of the various embodiments of the invention that follows.

SUMMARY

In consideration of the need for knowledge exchange among multiple nodes of a synchronization network, which may independently evolve common information to be synchronized across the nodes, the invention provides an efficient way to represent and exchange knowledge across nodes when synchronizing one or more subsets between any two nodes.

In various non-limiting embodiments, a first node sends a second node its knowledge and/or partial knowledge, including objects and versions of those objects. The second node compares its knowledge and/or partial knowledge with the knowledge and/or partial knowledge of the first node, and then sends the first node any latest versions of objects of which the first node is unaware. In addition, the second node sends its knowledge and/or partial knowledge to the first node. The first node then performs a similar object-by-object version comparison to determine any conflicts due to independent evolution of objects and any changes that should be sent to the second node in order to bring the objects of the second node up to date with the knowledge and/or partial knowledge of the first node.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The system and methods for representing synchronization knowledge and/or partial knowledge for multiple nodes sharing a set or subsets of the set of common information are further described with reference to the accompanying drawings in which:

FIG. 8 illustrates an example where two different versions of filtered knowledge are combined to form combined filtered knowledge in accordance with the invention;

DETAILED DESCRIPTION

Overview

As discussed in the background, there is no way to efficiently represent synchronization knowledge for a set of loosely coupled devices that do not remain in dedicated contact with one another, particularly where it is desirable to synchronize only a subset of data from one device to another. Where dedicated contact cannot be presumed, however, with devices appearing and disappearing, efficiently representing what those devices know and do not know from a synchronization standpoint is desirable. Particularly where partial knowledge exchanges can occur among the devices, the complete picture can get very cumbersome and difficult to describe in hard-coded metadata, even where devices can presume to remain connected.

Figure 1:
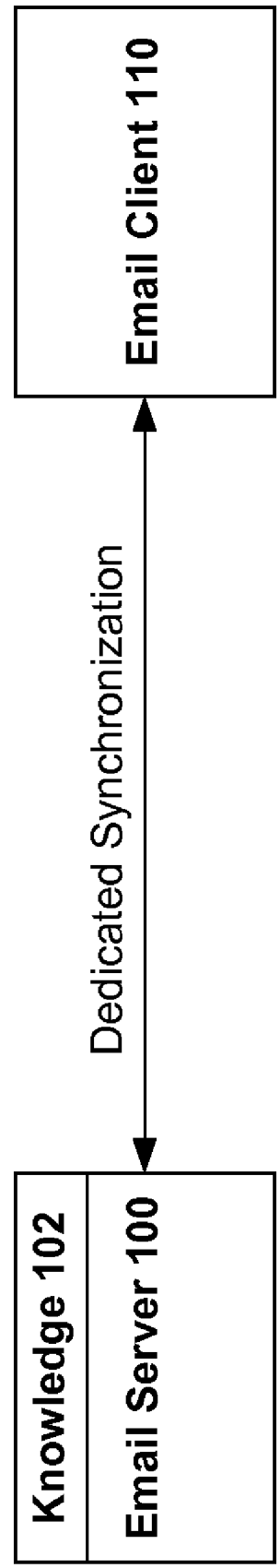
FIG. 1 illustrates a dedicated synchronization system that provides synchronization between two well defined endpoints of the system.
Figure 2A:
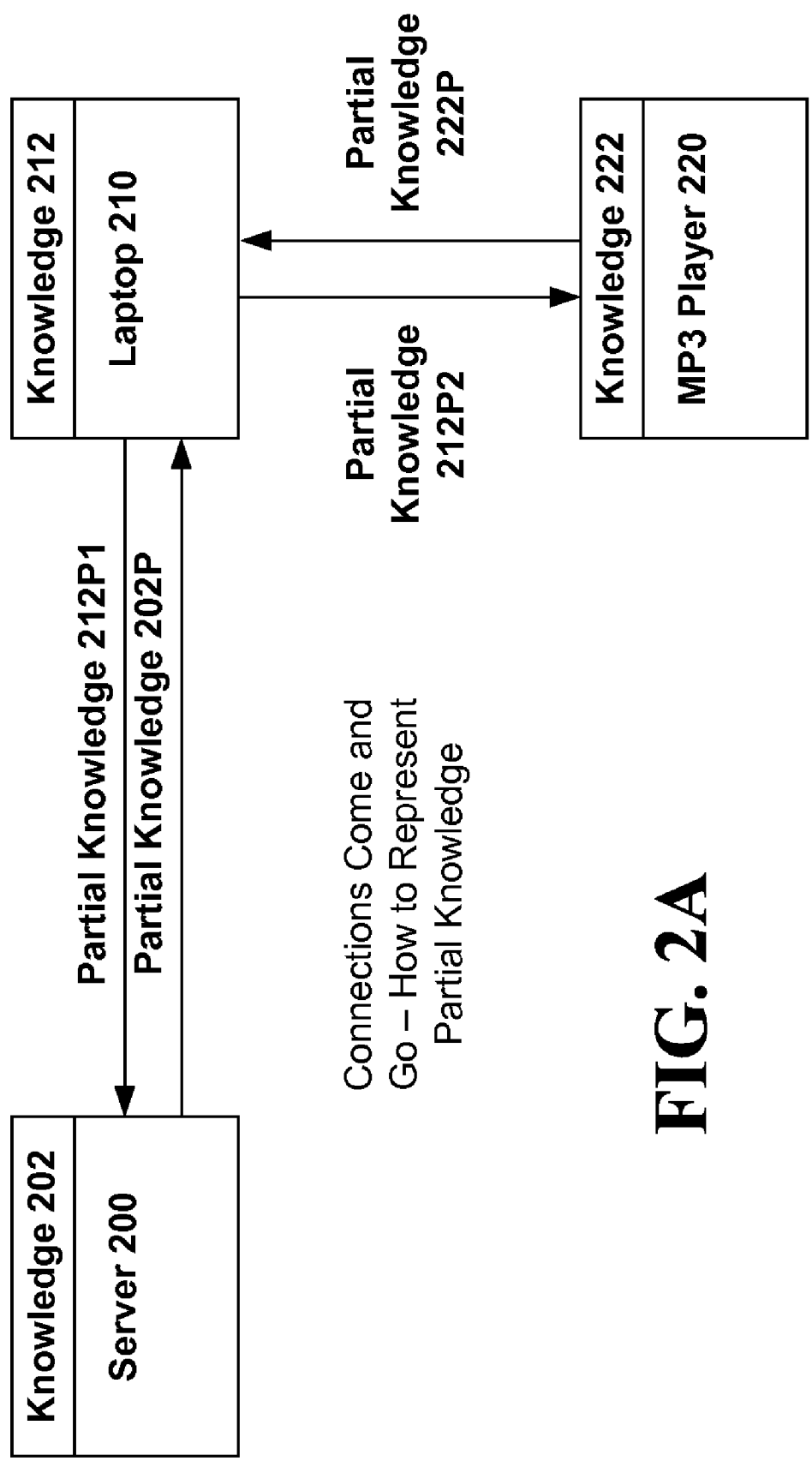
FIG. 2A illustrates an objective via a block diagram of how to represent partial knowledge in a multi-master system in accordance with the invention.

When the devices do not remain connected, the situation becomes even more complex. For instance, contemplate a multi-master situation with only 3 devices, a music server, a laptop and an MP3 player, wherein the topology appears as shown in FIG. 2A. The server 200 synchronizes a subset of music to laptop 210, and vice versa. In addition, the MP3 player 220 synchronizes a subset of music to laptop 210, and vice versa. Thus, for instance, laptop 210 might synchronize a subset of its knowledge 212P1 with server 200, but a different subset of knowledge 212P2 with MP3 player 220. In turn, server 200 can synchronize a subset of its knowledge 202P with laptop 210 and MP3 player can also synchronize a subset of its knowledge 22P with laptop 210. In this respect, the subset 202P can be different than the subset 222P. As the laptop 210 connects and disconnects to server 200, and as the MP3 player 220 connects and disconnects to laptop 210, the dialog respecting the partial knowledge exchanges among the devices becomes extremely complex after only a few synchronization passes. The problem becomes more difficult if more devices enter the picture bringing different levels of partial knowledge to the table.

Figure 2B:
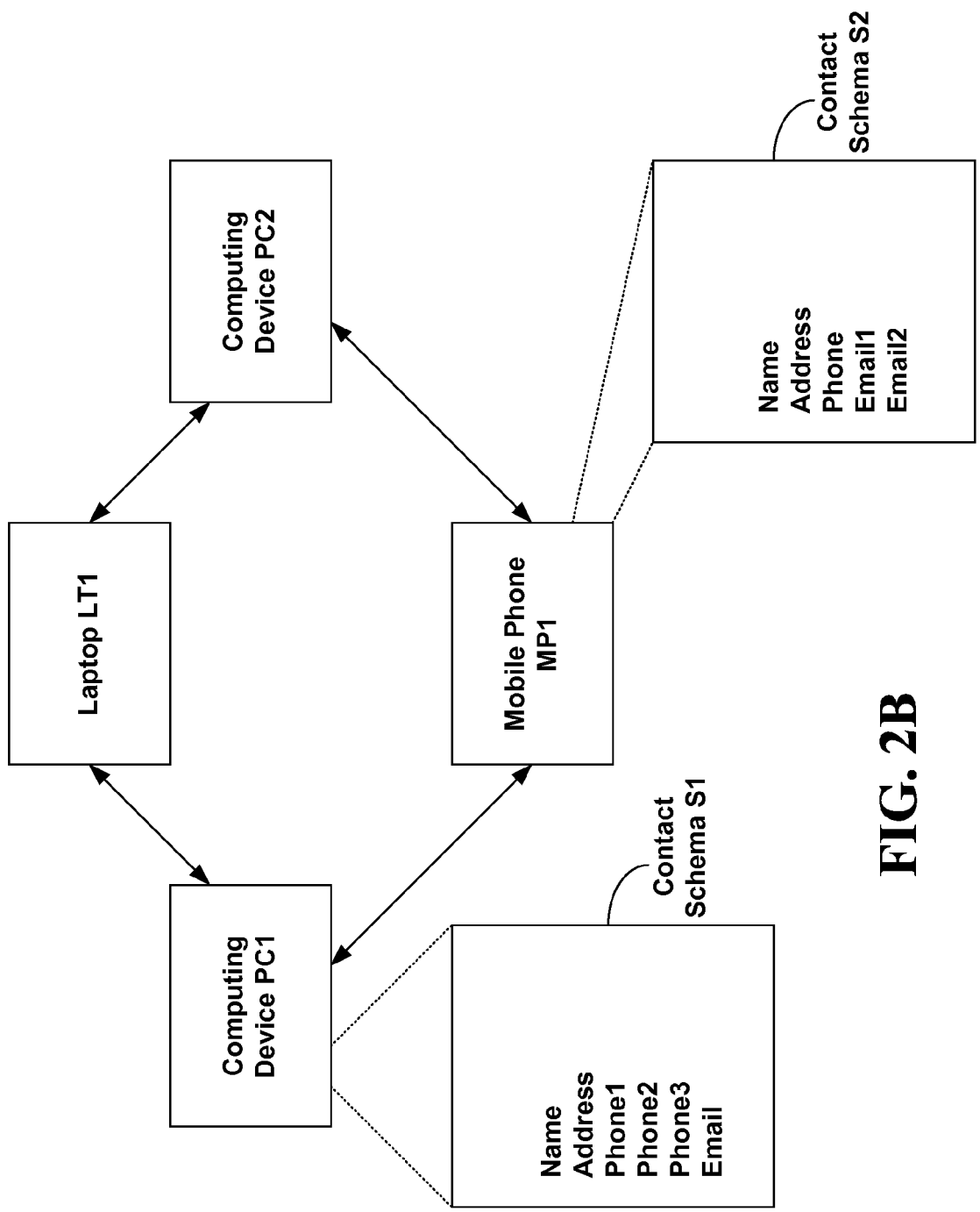
FIG. 2B illustrates an exemplary, non-limiting scenario wherein different devices may exhibit a preference for synchronizing a subset of data from two different, but similar, schema in accordance with the invention.

Adding an additional layer of complexity is that different devices may organize similar data quite differently, e.g., when different endpoints use different schema to represent the same concept. For instance, shipping orders or contacts might be represented with different schema on different devices. As shown in FIG. 2B, each of devices PC1, PC2, MP1 and LT1 can represent similar data such as contacts with different schema. For example, PC1 might include contact schema S1 having 1 Name field, 1 Address field, 3 Phone fields and 1 Email field and mobile phone MP1 might include contact schema S2 having 1 Name field, 1 Address field, 1 Phone field and 2 Email fields. While PC1 cannot transfer all of its knowledge to MP1 because MP1 has no way to store 3 Phone fields, there should nonetheless be a flexible way to send a subset of PC1's knowledge to mobile phone MP1. Specifically, there should be a way to send one or more of 1 Name field, 1 Address field, 1 Phone field and 1 Email field to mobile phone MP1. While mobile phone MP1 will not have a complete picture of PC1, it will have more knowledge than before if it is able to synchronize just the subset of data according to a knowledge exchange.

The subsetting of synchronization data problem is extendible to any synchronization scenario. For instance, one device may be able to support high definition video while another device may only support low definition video, or one device may support high resolution photos, whereas a mobile phone might only support thumbnail size photos. In such cases, syncing a video or photo, respectively, to the second device involves transcoding the higher resolution versions to lower resolution versions, which is in effect a subsetting operation, i.e., only a subset of the information available on the first device is synchronized to the second device.

In consideration of such need to efficiently describe partial knowledge synchronization in a multi-master synchronization system, in various non-limiting embodiments described below, the invention provides an efficient and flexible way to track and describe the evolution of knowledge, and succinctly represent present knowledge of the devices in the system as a function of partial knowledge, or subsets of knowledge, learned from other devices. In one embodiment, a knowledge vector with versioning information is used to represent knowledge, and subsets of data being synchronized include additional metadata that efficiently describes the partial knowledge exchange as such.

As a general roadmap for what follows herein, first, a general mechanism is described that ensures whenever a device has access to other device(s) in a loosely coupled network, the device will exchange knowledge with the other device(s) in order to determine which changes should be retrieved by the device and conveyed to the other device(s). Then, it is shown how the general mechanism for knowledge exchange can be extended to include representations of partial knowledge exchanges among the devices. A special case is considered for synchronizing a subset of data among devices where it is known that there will be no moves into or out of the subset of data.

In this fashion, while a first device and a third device may never communicate directly, if each is able to connect to a second device, a collective share of knowledge can be achieved across all three devices, determining what changes each of the devices should receive from each of the other devices. With the invention, partial knowledge learned at the second device from the first device and partial knowledge learned from the third device can be combined into a single representation of all the knowledge understood by the second device, which in turn can be synchronized to the other devices.

Considering the proliferation of devices that share data, such as music, email, pictures, videos, advantageously, the knowledge exchange techniques of the invention are scalable to any number of devices, and any number of independent knowledge bases (i.e., different sets of common information) simultaneously, i.e., anywhere any evolving set of devices wish to share whole or partial data. Various embodiments of representing such knowledge or partial knowledge in a distributed system are described in more detail below.

Efficient Knowledge Representation and Exchange

As a prelude to describing the synchronization of subsets of data in accordance with the invention, in this section, an overview is presented of a general mechanism for efficiently representing knowledge in data synchronization systems. The general mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes might be made to some information that is to be shared between the two devices. At any time they become connected, however, by exchanging their knowledge with one another, they become aware of at least the minimum amount of information needed to reconstruct what each other knows and doesn't know to facilitate of changes between the devices. It is noted that where more than two devices are involved, knowledge may be incomplete knowledge of a greater base of information to be shared, but as more knowledge is shared around the multiple devices, collective knowledge continues to be accrued by the devices as they connect to the other devices over time.

Advantageously, the invention operates to perform synchronization for a set of devices all interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 3A:
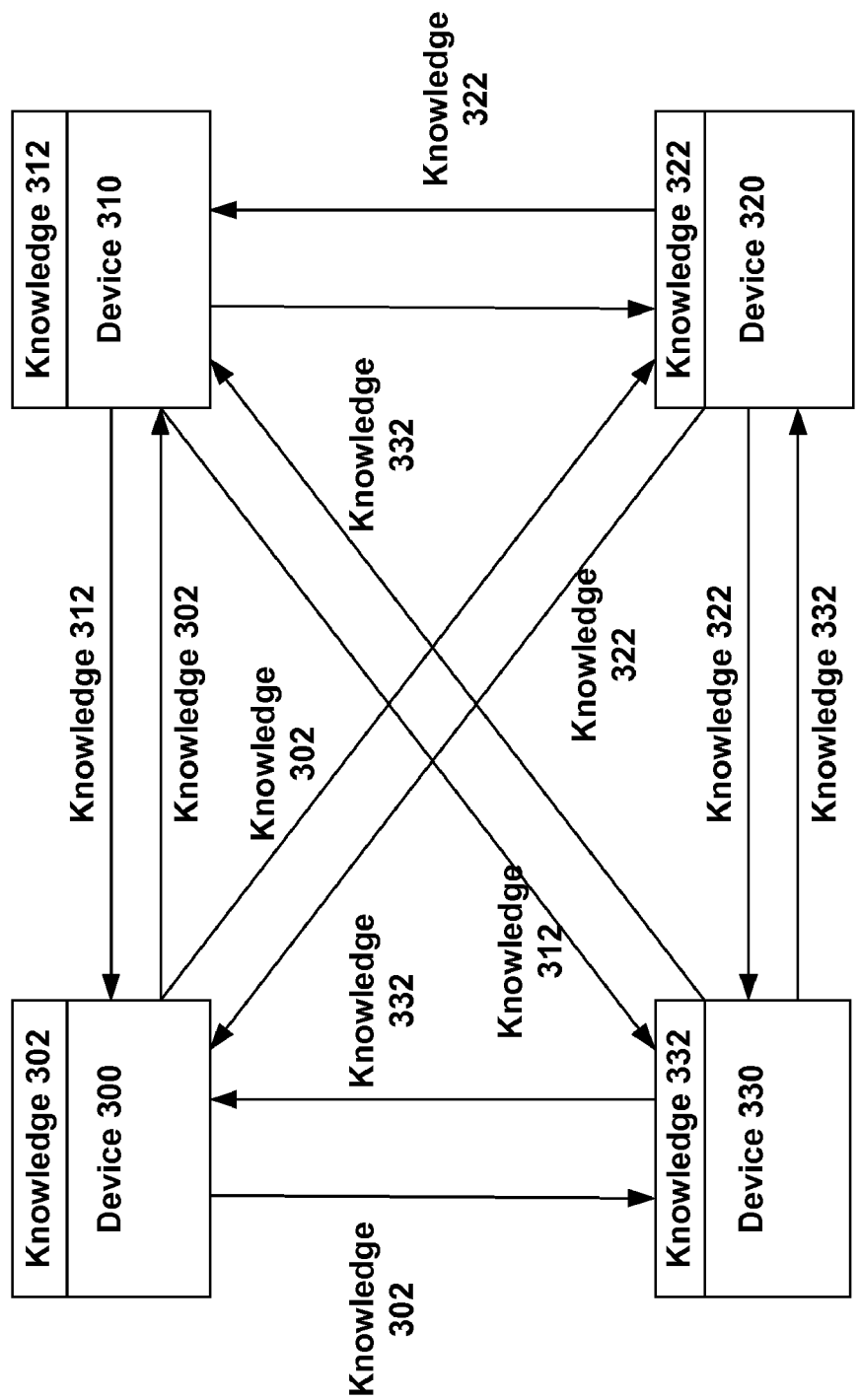
FIG. 3A illustrates exemplary non-limiting knowledge exchange between four nodes of a loosely connected network of nodes in accordance with the invention.

FIG. 3A illustrates that the knowledge exchange of the invention is generalizable, or scalable, to any number of devices. As shown, four devices 300, 310, 320 and 330 are shown with knowledge representations 302, 312, 322 and 332 that respectively indicate what each device knows and doesn't know about a set of common information to be shared across the devices.

Figure 3B:
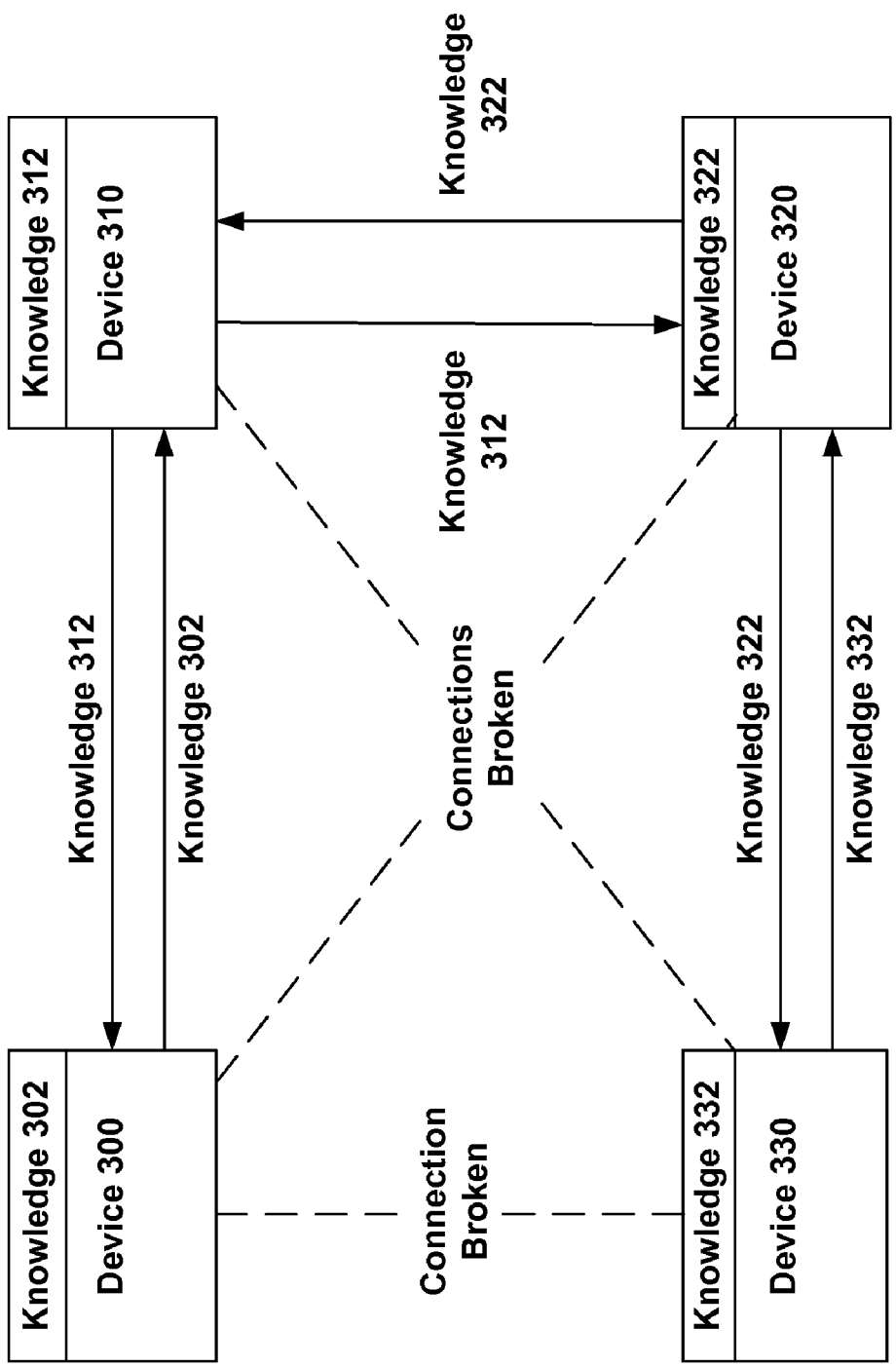
FIG. 3B illustrates exemplary non-limiting knowledge exchange between four nodes of a loosely connected network of nodes in accordance with the invention when some of the devices become disconnected from one another.

Advantageously, as shown by FIG. 3B, even where connections in the network become disconnected, a complete set of knowledge can nonetheless be gained by all of the devices 300, 310, 320, and 330, as long as at least one connection directly or indirectly exists to the other devices. For instance, as shown, knowledge 332 of device 330 still reaches device 300 via the knowledge exchange with device 320, then via the knowledge exchange between device 320 and 310, and finally via the knowledge exchange between device 310 and 300.

With more devices sharing knowledge about common information to be shared, all of the devices benefit because the knowledge exchange of the invention is agnostic about from which device collective knowledge comes. The devices of the invention each independently operates to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network.

Figure 4A:
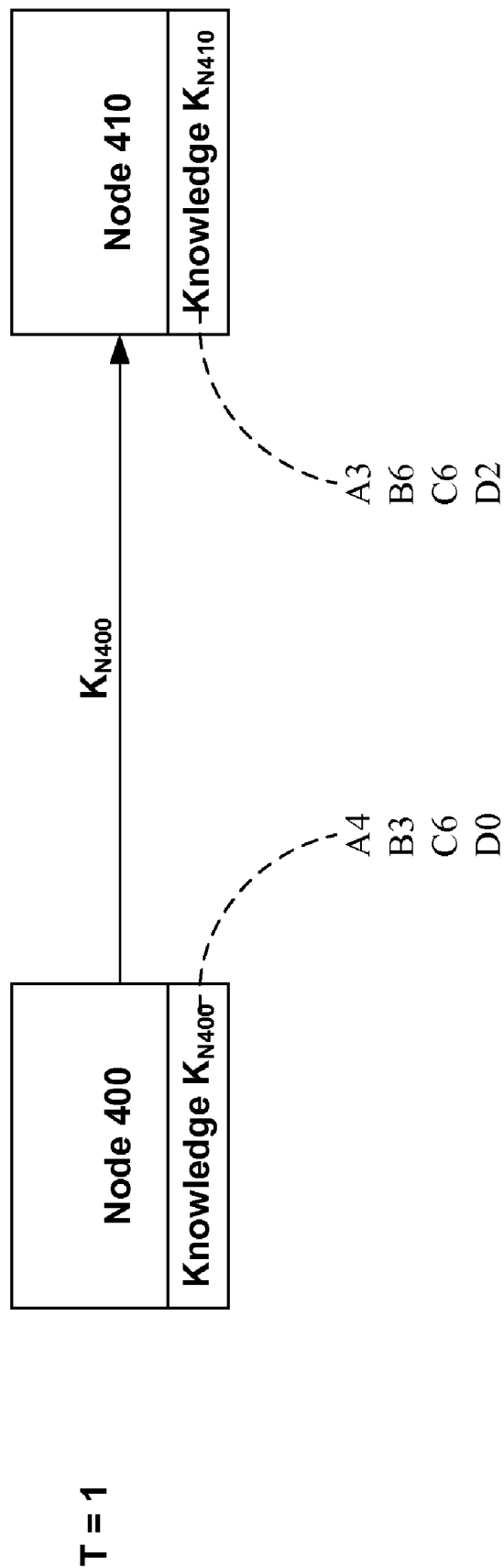
FIGS. 4A, 4B and 4C illustrate exemplary knowledge exchange in the context of multiple objects shared among nodes of a network in accordance with the invention.

Thus, as shown in FIG. 4A, node 400 of a peer-to-peer network having any number of nodes wants to exchange data with Node 410. Node A begins by requesting changes from Node 410 and in order to do so Node 400 sends its knowledge (represented as $K_{N400}$) to Node 410 as shown.

Knowledge of a device or node is represented by labeling each object to be shared among devices with a letter identifier, and then the trailing number represents the latest version for this object. For instance, $K_{N400}$ as shown in FIG. 4A includes objects A, B, C and D each to be synchronized between nodes 400 and 410, and the number following each of the objects represents the latest version of the object known to the device. For instance, knowledge $K_{N400}$ at a time t=1 includes the $5^{th}$ version of A, the $4^{th}$ version of B, the $7^{th}$ version of C, and the $1^{st}$ version of D, notated as A4, B3, C6, D0 in FIG. 4A. In contrast, knowledge $K_{N410}$ of node 410 at a time t=1 may include the $4^{th}$ version of A, the $7^{th}$ version of B, the $7^{th}$ version of C, and the $3^{rd}$ version of D, notated as A3, B6, C6, D2 in FIG. 4A.

Figure 4B:
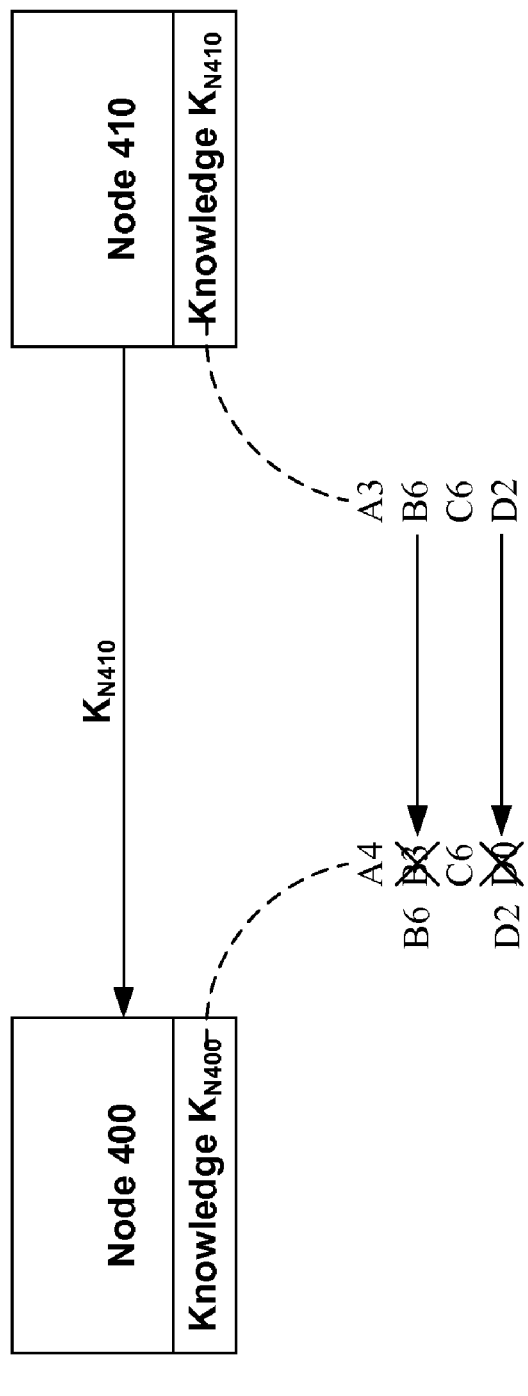

As shown in FIG. 4B, at time T=2, node 410 compares knowledge $K_{N400}$ received from node 400 against its own knowledge $K_{N410}$ and determines what needs to be sent to node 400. In this example, as a result, node 410 will send node 400 the changes relating to B and D since node 400's knowledge of B3, D0 is behind node 410's knowledge of B6 and D2. When node 410 sends node 400 the changes between B6 and B3, and the changes between D2 and D0, it also sends along the latest version of knowledge $K_{N410}$ it has (reflecting whenever the last change on node 410 was made).

Figure 4C:
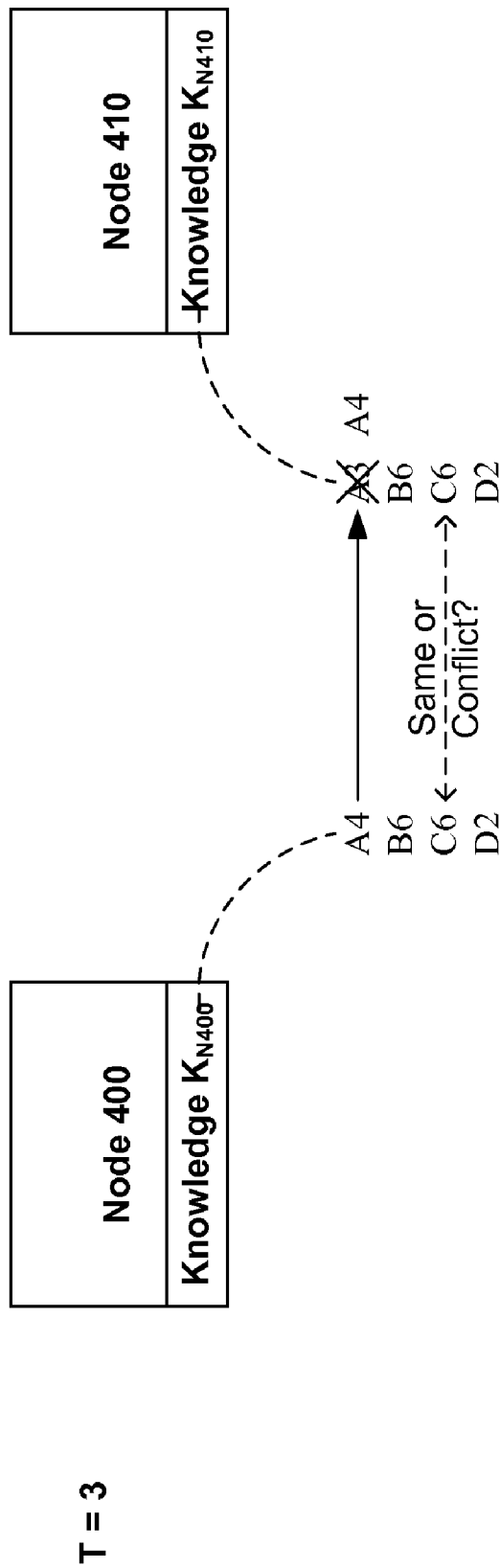

As shown in FIG. 4C, representing time t=3, sending knowledge $K_{N410}$ to node 400 allows node 400 to detect conflicts (e.g., store them for later resolution) if it later finds out that both node 400 and node 410 made a change to an object while they were on the same version. This allows for autonomous updating, efficient enumeration, but also correct conflict detection when the nodes meet and exchange changes. For instance, in the example, if C6 is not the same object in both knowledge $K_{N410}$ and $K_{N410}$, e.g., if both independently evolved from C5 to C6, then which C6 is the correct C6 can be set aside for conflict resolution, e.g., according to pre-set policy resolution that befits the synchronization scenario and devices involved.

Figure 5:
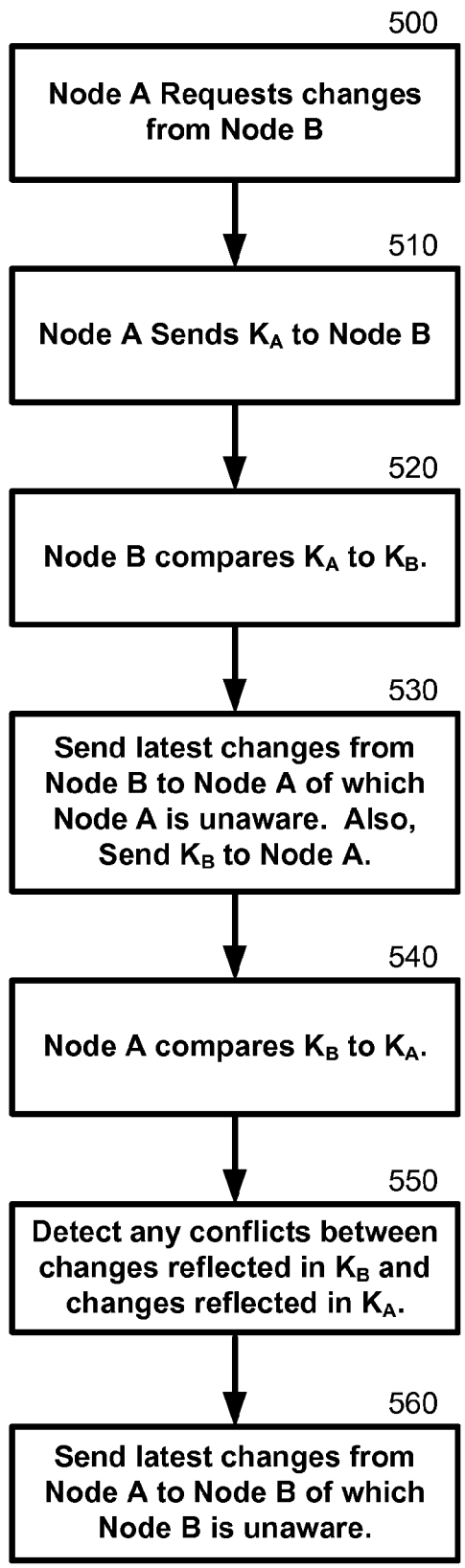
FIG. 5 is an exemplary non-limiting flow diagram illustrating the process for knowledge exchange in the context of multiple objects shared among nodes of a network in accordance with the invention.

An exemplary knowledge exchange process between any two nodes of a distributed multi-master synchronization environment using the above described general mechanism is shown in the flow diagram of FIG. 5. At 500, node A requests synchronization with node B, thereby asking node B for changes node A does not know about. In order to equip node B, at 510, node A sends its knowledge to node B. At 520, node B compares the knowledge received from node A with its own knowledge to determine what changes node B knows about that should be sent to node A. At 530, node B sends such changes to node A, and in addition, node B sends its knowledge to node A so that node A can perform a similar knowledge comparison at 540.

At 550, node A detects any potential conflicts between latest versions reflected in the knowledge of node B and latest versions reflected in the knowledge of node A, in the event that independent evolution of versions has occurred on node A and node B. In accordance with the invention, any conflict resolution policy may be applied to determine which node trumps the other node in the event of a conflict. At 560, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Efficient Knowledge Subset Representation and Exchange

As discussed above in connection with the generalized mechanism for representing knowledge in a multi-master synchronization environment, knowledge of a device or node can be efficiently represented by labeling each object to be shared among devices with a letter identifier including a trailing number that represents the latest version for this object. In this regard, knowledge defines the summary of the state based synchronization of a replica. However, as mentioned in the background and overview, in many cases it is useful to synchronize a subset of the data that is contained within a given endpoint. When this happens, in accordance with the invention, knowledge is augmented to reflect that subset. In an exemplary, non-limiting embodiment, the invention achieves this via a filter mechanism and represents subsets as a form of filtered knowledge.

Additionally, the case of subsetting in a synchronization environment is particularly interesting when there are no moves into our out of the subset. In this regard, the invention sets forth various ways to use and represent filtered knowledge when there are no moves. In particular, this type of subsetting can be applied to the properties of an item thus allowing two different synchronizing endpoints to have different (but compatible) schemas and still synchronize.

Accordingly, the uses for the subsetting representation as filtered knowledge, as described herein, are virtually limitless. Subsetting of every kind is very popular in synchronization scenarios. Being able to represent and combine information about filters efficiently is very important and advantageously, the invention allows replicas to maintain similar, but not identical schemas and still synchronize according to efficient knowledge exchanges in a multi-master synchronization environment.

In more detail, the invention provides various embodiments for no move filters with knowledge based synchronization, as described in the previous section. As mentioned, knowledge is normally represented as a version vector, representing the maximum tick count a given endpoint has ever seen from any other endpoint in the community with which it synchronizes for a given set of data. Another way of thinking of this vector is as a scope vector since it defines the scope of knowledge of the objects possessed by a device.

In addition to the vector representing the whole scope, knowledge can also contain exceptions. Knowledge exceptions also consist of a version vector and represent situations where a different amount of information is known for some subset of the scope than is known about the whole scope. This can take the form of an exception for a single item, or an exception of a range of items.

In accordance with the invention, filtered knowledge can take the form of an exception in knowledge as well. Instead of an exception representing a single item or a range of items, the exception vector applies to the contents of the filter.

In this regard, the invention enables description and maintenance of the contents of the filter for the case of filters with no moves. It is first noted that the vector component for the local replica is known regardless of filter applied. Another way to say this is that any given replica can assert that it knows all changes that it has ever made.

The notion of a replica maintaining a filtered subset of the data that it is capable of representing is distinguishable from the notion of a replica that is maintaining the maximum amount of information that it is capable of maintaining where that maximum is also a subset of the data maintained within the community. The latter case is particularly interesting and can be classified as a filtered replica. Since a replica knows all local changes at the scope level regardless of filter, a filtered replica that has not received changes from another replica does not need to represent its knowledge as filtered.

With respect to sending and receiving data, in one embodiment, there are at least two cases to consider supporting for sending and receiving data in accordance with the invention. A first case to consider is when all of the possible data that a replica maintains has been sent. A second case is when only a subset of the data maintained by a replica has been sent.

For the first case, i.e., receiving all of the data from a replica, with a filtered or unfiltered synchronization, when a replica receives all of the data known by another replica, the replica implicitly learns all the knowledge of that replica. This becomes very interesting when considering learning information from a filtered replica. If the filtered replica only contains information that applies to the entire scope, then the replica that receives changes from the filtered replica merely applies a scope level vector to its knowledge.

The second case, receiving partial data from a replica, is the main subject of the filtered synchronization of the invention. There are multiple ways that this could happen. For instance, the source replica could contain a strict superset of the data maintained by the destination or there could be a common overlap between the source and destination. In either case, the destination can only learn partial knowledge from the source.

In accordance with the invention, when the destination replica can only learn partial knowledge from a source replica, the destination replica creates an exception that represents the filter and a vector to represent what has been learned in that case.

To accomplish a filtered synchronization, each replica maintains a description of the filtered set maintained in its store. When sending changes to another replica, along with its knowledge, it sends this filter definition to the destination even when no filter is being exchanged.

The destination then first checks to see if the filtered subset of data from the source is strictly a subset of its own filter. If the filtered subset of data is a subset of its own filter, then the destination simply learns the knowledge of the source. If the filter is not a strict subset, then the destination only learns the projection of the source's knowledge onto the intersection of its own filter with the filter from the source replica.

Figure 6:
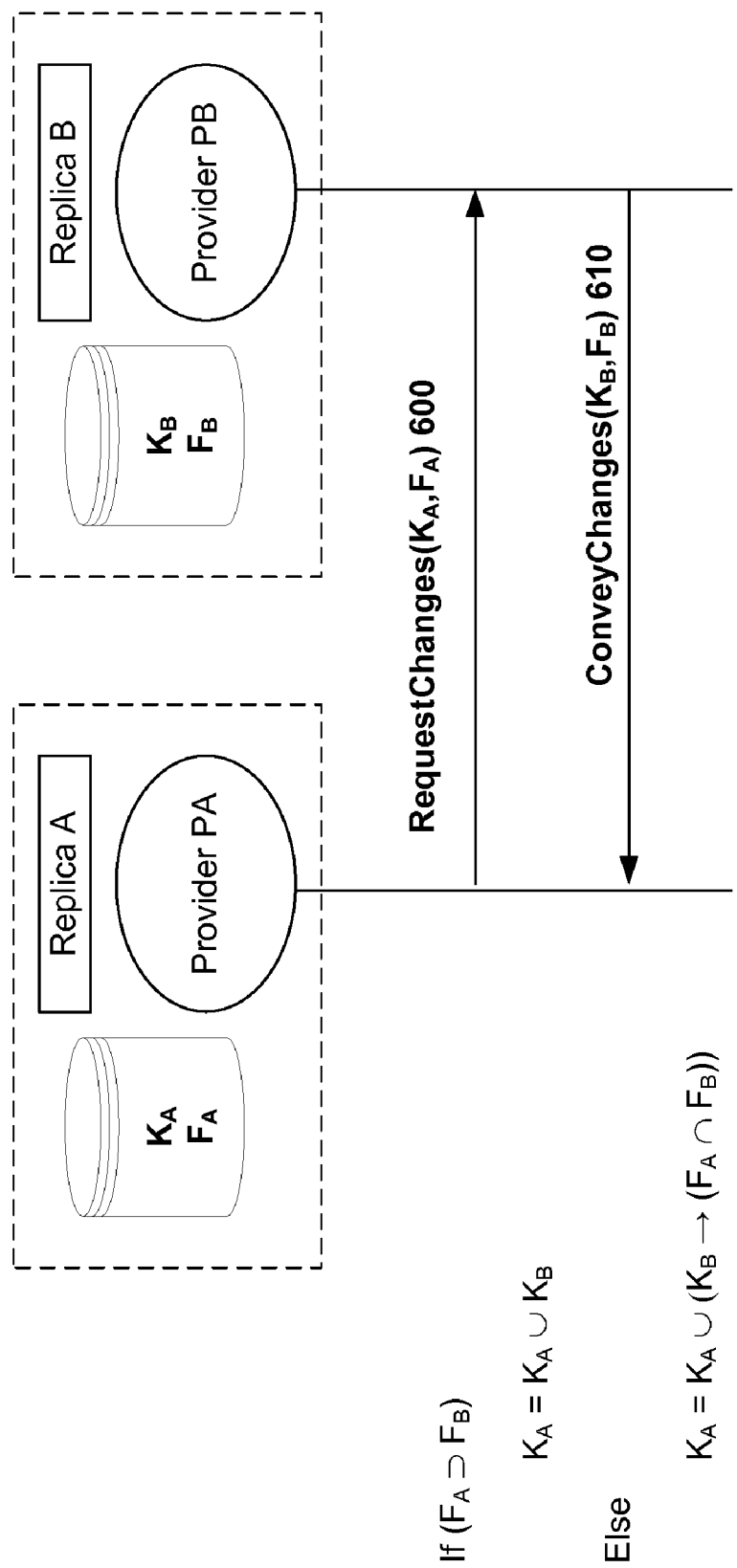
FIG. 6 is a general architecture illustrating the framework for requesting and conveying changes based on knowledge and partial knowledge in accordance with the invention.

FIG. 6 illustrates the generalized mechanism for exchanging knowledge when filtered knowledge is possible as described above. As shown, each replica A and B has provider PA and provider PB, respectively. According to the techniques of the invention, each replica A and B maintains knowledge $K_A$ and $K_B$, respectively, and potentially also maintains filtered knowledge $F_A$ and $F_B$. Similar to the case with no subsetting, any of the replicas can request changes 600 of another replica and receive changes 610 in response to the other replica conveying changes. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cap F_B))$$

Figures 7A, 7B:
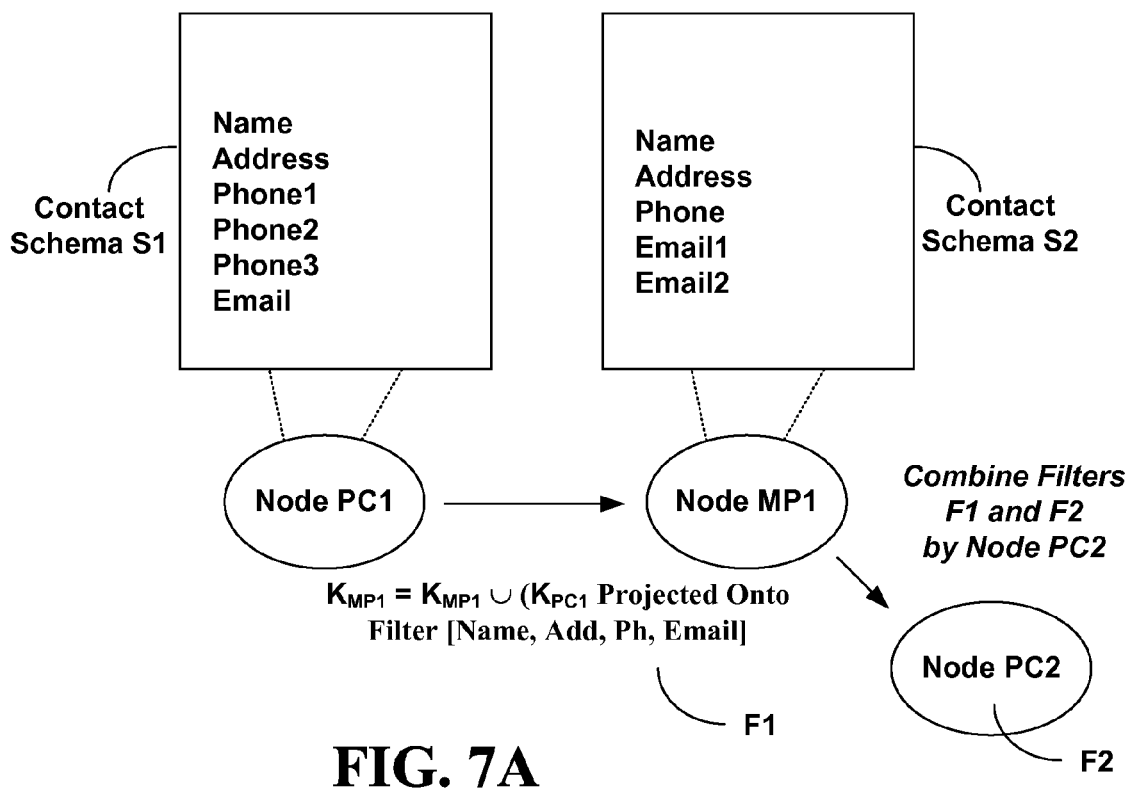
FIGS. 7A and 7B illustrate exemplary filter representations of knowledge and combinations of filter representations implemented in accordance with various non-limiting embodiments of the invention.

As mentioned, this type of subsetting can be applied to the properties of an item thus allowing two different synchronizing endpoints to have different, but compatible, schemas and still synchronize. As shown in FIG. 7A, for the properties of contact objects stored on node PC1, for example, contact schema S1 applies from FIG. 2A and for the properties of contact objects stored on node MP1, contact schema S2 applies from FIG. 2A as well. In such a case, the intersection of filtered knowledge results in a filter F1 of scope [Name, Address, Phone, Email], since both PC1 and MP1 have Name in schemas S1 and S2, both PC1 and MP1 have Address in schemas S1 and S2, MP1 can only represent one Name property and PC1 can only send one Email property to MP1 in schemas S1 and S2. This is represented by common representation for a filter 700 of FIG. 7B having columns 702, e.g., corresponding to properties, and to entries entry1, entry2, entry3, entry4, entry5, etc.

Accordingly, after a knowledge exchange between node PC1 and node MP1, node MP1 might further synchronize with a node PC2 having filtered knowledge F2, in which case filter representation 700 can then be used to combine the filtered versions on a component by component basis, e.g., column by column basis.

Exemplary combination of filtered knowledge $F_A$ and $F_B$ is illustrated in FIG. 8 wherein filtered knowledge $F_A$ is shown having scope [Name, Address, Phone]: with items A15, B35, C25 and E30 and $F_B$ is shown having scope [Name, Address, Email]: with items A45, B25, C30 and D16. When filtered knowledge $F_A$ and $F_B$ are combined, result 800 is produced by taking the component wide maximum versions for the items. The results for name 801, address 802, phone 803 and email 804 reflect the combined knowledge and a new representation of filtered knowledge for that replica. In this fashion, both knowledge and partial knowledge can be learned by any replica that synchronizes within a multi-master synchronization system in a flexible (devices coming and going) and efficient (compact representation of knowledge and partial knowledge learned from other devices) manner in accordance with the invention.

Figure 9:
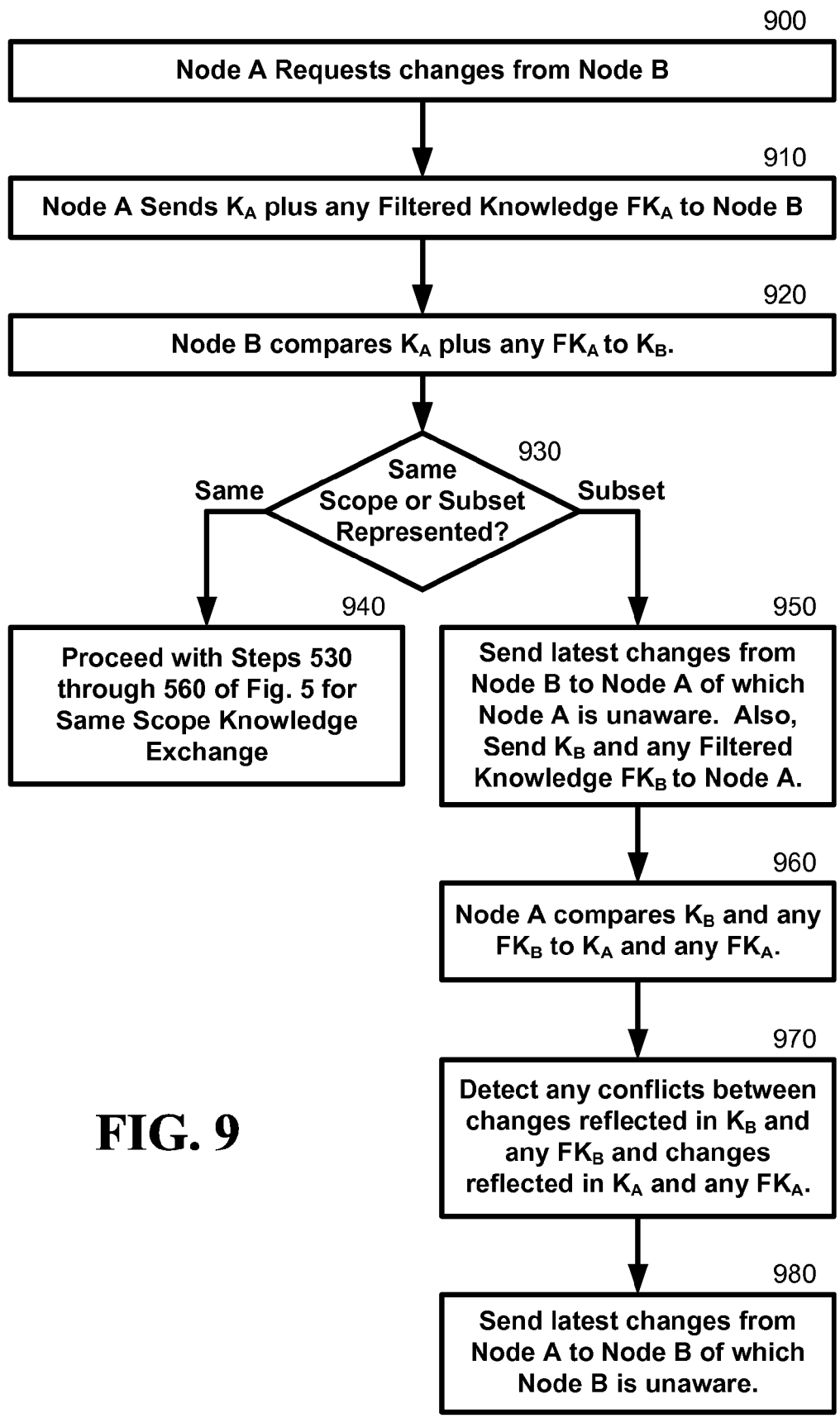
FIG. 9 is an exemplary non-limiting flow diagram illustrating the process for knowledge and/or partial knowledge exchange in the context of multiple objects shared among nodes of a network in accordance with the invention.

FIG. 9 illustrates an exemplary flow diagram for accommodating both full synchronization of knowledge and synchronization of any partial knowledge among a set of devices in a multi-master synchronization environment. At 900, node A requests any changes from node B. At 910, in response, node A sends $K_A$ and any filtered knowledge $FK_A$ to node B and at 920, node B compares $K_A$ and any $FK_A$ to its own knowledge $K_B$. If at 930, there is no filtered knowledge $FK_A$, then $K_A$ and $K_B$ are of the same scope, and knowledge exchange proceeds as in the general case without subsetting at 940. However, if a subset of information is represented as part of the synchronization exercise, then at 950, the latest changes are sent from node B to node A of which node A is unaware. Also, $K_B$ and any filtered knowledge $FK_B$ are sent to node A. Next, at 960, node A compares knowledge $K_B$ and any $FK_B$ with $K_A$ and any $FK_A$ and the knowledge and filtered knowledge are combined to form node A's new knowledge. At 970, any conflicts among the data are resolved and at 980, the latest changes of which node B is unaware are sent from node A to node B.

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter.

Figure 10:
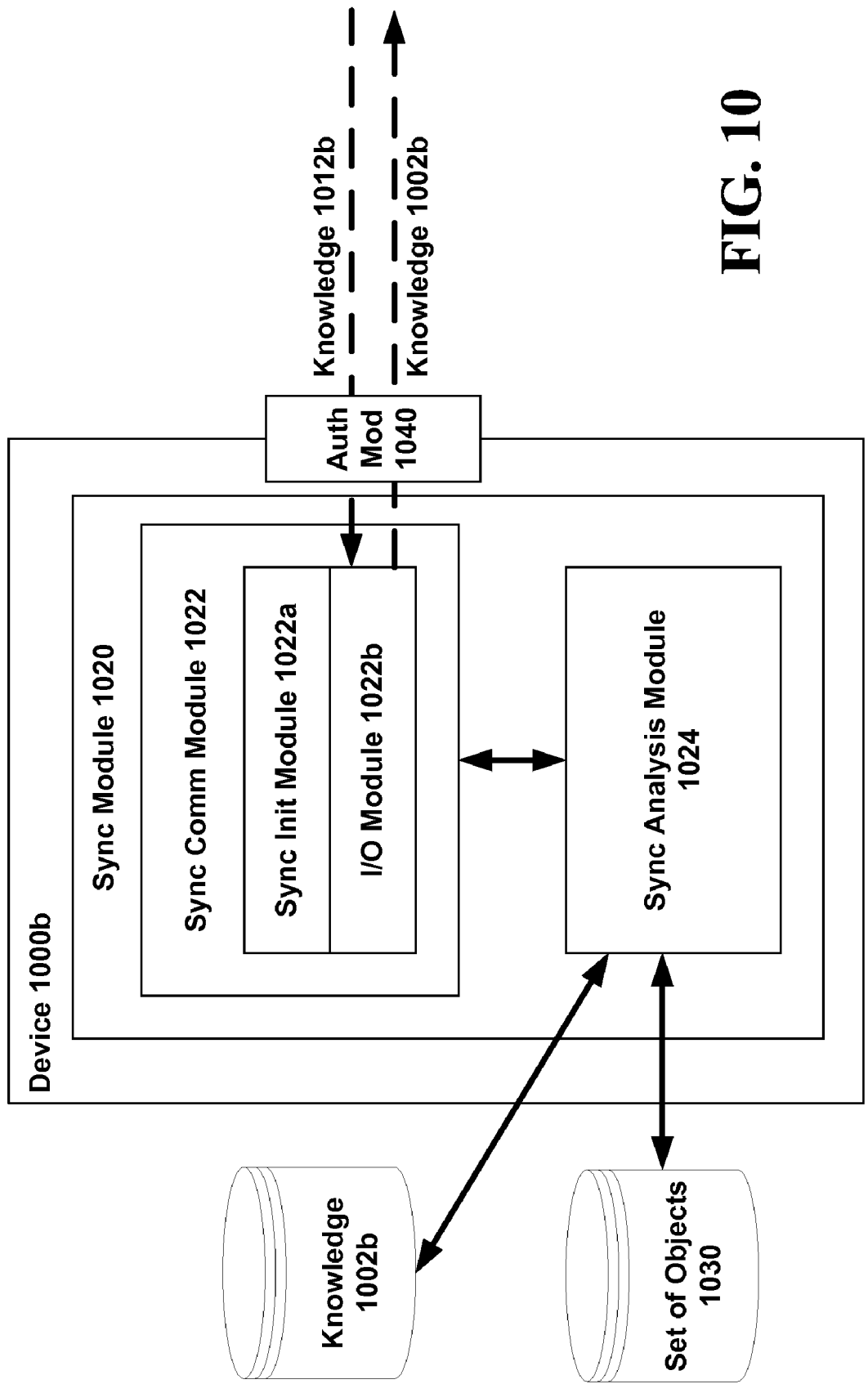
FIG. 10 is a block diagram of an exemplary non-limiting implementation of a device for performing a knowledge exchange in accordance with the invention.

FIG. 10 is a block diagram of an exemplary non-limiting implementation of a device 1000b for performing a full or partial knowledge exchange in accordance with the invention. As shown, device 1000b includes a sync module 1020 that performs the full or partial knowledge exchange techniques for synchronizing a set of objects 1030 with another device in accordance with the invention. Sync module 1020 may include a sync communications module for generally transmitting and receiving data in accordance with the knowledge exchange techniques of the invention.

Sync module 1020 may also include a sync initiation module 1022a which may initiate synchronization with a second device if authorized, e.g., via authorization module 1040, and connected to the second device. Sync module may also include an I/O module responsive to the initiation of synchronization by sending full and/or partial knowledge 1002b about the set of objects 1030 to the second device (not shown) and for receiving back full and/or partial knowledge 1012b of the second device and changes to be made to the set of objects 1030 originating from the second device. In turn, a sync analysis module 1024 operates to apply the changes to be made to the set of objects 1030 and to compare full and/or partial knowledge 1012b from the second device with the full and/or partial knowledge 1002b of the first device in order to determine changes to send to the second device to complete synchronization between the devices.

The systems and methods for efficiently representing knowledge of the invention may also be applied to the context of resolving in memory data on the same provider. In such context, the in memory data may not be backed by a physical store, e.g., it might be used in a graph solver on the CPU to synchronize nodes. The invention may also be applied in the context of scene graphs, especially as they become more distributed on multi-core architectures and calculations are written directly to an in memory data structure such as a volumetric texture.

Exemplary Networked and Distributed Environments

One of ordinary skill in the art can appreciate that the synchronization knowledge representation and exchange of the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with synchronization techniques in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for synchronizing in accordance with the invention.

Figure 11:
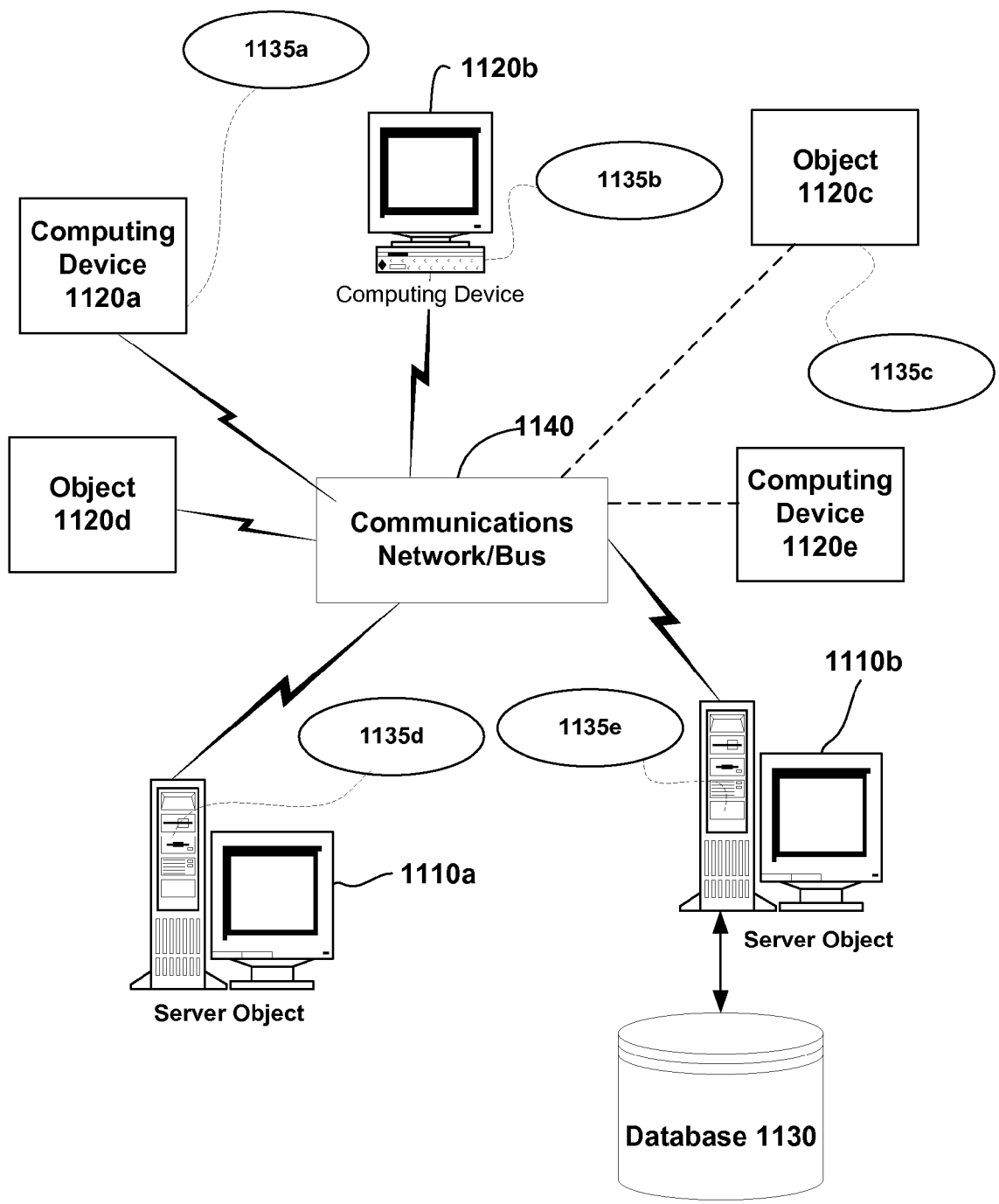
FIG. 11 is a block diagram representing an exemplary non-limiting networked environment in which the present invention may be implemented.

FIG. 11 provides a schematic diagram of an exemplary networked or distributed computing environment. The distributed computing environment comprises computing objects 1110a, 1110b, etc. and computing objects or devices 1120a, 1120b, 1120c, 1120d, 1120e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1140. This network may itself comprise other computing objects and computing devices that provide services to the system of FIG. 11, and may itself represent multiple interconnected networks. In accordance with an aspect of the invention, each object 1110a, 1110b, etc. or 1120a, 1120b,

1120*c*, 1120*d*, 1120*e*, etc. may contain an application that might make use of an API, or other object, software, firmware and/or hardware, suitable for use with the systems and methods for synchronizing with knowledge in accordance with the invention.

It can also be appreciated that an object, such as 1120*c*, may be hosted on another computing device 1110*a*, 1110*b*, etc. or 1120*a*, 1120*b*, 1120*c*, 1120*d*, 1120*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to synchronizing according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120*a*, 1120*b*, 1120*c*, 1120*d*, 1120*e*, etc. can be thought of as clients and computers 1110*a*, 1110*b*, etc. can be thought of as servers where servers 1110*a*, 1110*b*, etc. maintain the data that is then replicated to client computers 1120*a*, 1120*b*, 1120*c*, 1120*d*, 1120*e*, etc., although any computer can be considered a client, a server, or both, depending on the circumstances. Any of these computing devices may be processing data or requesting services or tasks that may implicate the synchronization techniques with knowledge in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for synchronizing based on knowledge in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 11 illustrates an exemplary networked or distributed environment, with server(s) in communication with client computer (s) via a network/bus, in which the present invention may be employed. In more detail, a number of servers 1110*a*, 1110*b*, etc. are interconnected via a communications network/bus 1140, which may be a LAN, WAN, intranet, GSM network, the Internet, etc., with a number of client or remote computing devices 1120*a*, 1120*b*, 1120*c*, 1120*d*, 1120*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to synchronize any kind of data.

In a network environment in which the communications network/bus 1140 is the Internet, for example, the servers 110*a*, 110*b*, etc. can be Web servers with which the clients 1120*a*, 1120*b*, 1120*c*, 1120*d*, 1120*e*, etc. communicate via any of a number of known protocols such as HTTP. Servers 1110*a*, 1110*b*, etc. may also serve as clients 1120*a*, 1120*b*, 1120*c*, 1120*d*, 1120*e*, etc., as may be characteristic of a distributed computing environment.

As mentioned, communications may be wired or wireless, or a combination, where appropriate. Client devices 1120a, 1120b, 1120c, 1120d, 1120e, etc. may or may not communicate via communications network/bus 14, and may have independent communications associated therewith. For example, in the case of a TV or VCR, there may or may not be a networked aspect to the control thereof. Each client computer 1120a, 1120b, 1120c, 1120d, 1120e, etc. and server computer 1110a, 1110b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1110a, 1110b, 1120a, 1120b, 1120c, 1120d, 1120e, etc. may be responsible for the maintenance and updating of a database 1130 or other storage element, such as a database or memory 1130 for storing data processed or saved according to the invention. Thus, the present invention can be utilized in a computer network environment having client computers 1120a, 1120b, 1120c, 1120d, 1120e, etc. that can access and interact with a computer network/bus 1140 and server computers 1110a, 1110b, etc. that may interact with client computers 1120a, 1120b, 1120c, 1120d, 1120e, etc. and other like devices, and databases 1130.

Exemplary Computing Device

Figure 12:
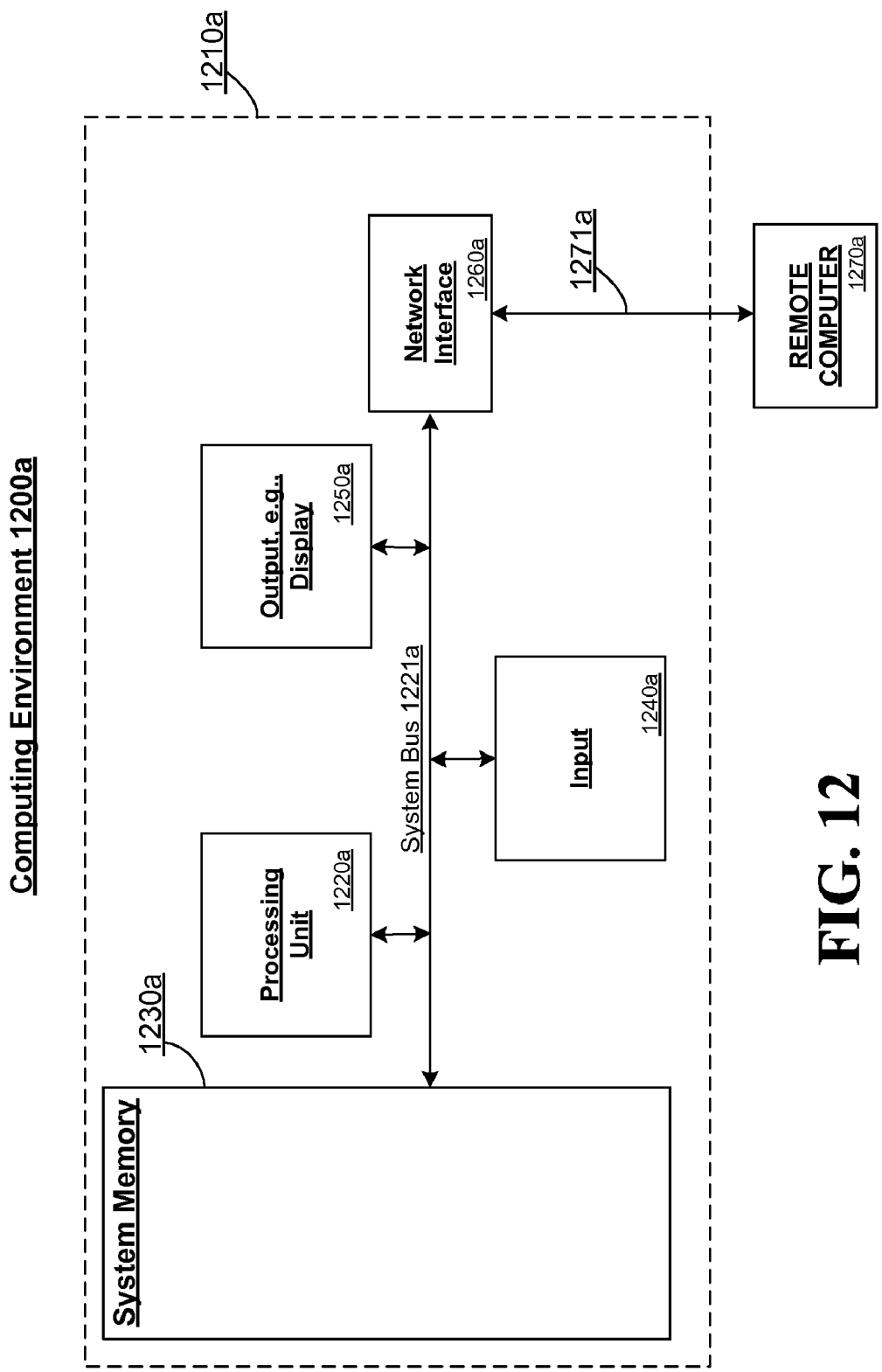
FIG. 12 is a block diagram representing an exemplary non-limiting computing system or operating environment in which the present invention may be implemented.

As mentioned, the invention applies to any device wherein it may be desirable to synchronize any kind of data across a set of devices. It should be understood, therefore, that handheld, portable and other computing devices and computing objects of all kinds are contemplated for use in connection with the present invention, i.e., anywhere that a device may benefit from sharing of data across devices or otherwise receive, process or store data. Accordingly, the below general purpose remote computer described below in FIG. 12 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 12 thus illustrates an example of a suitable computing system environment 1200a in which the invention may be implemented, although as made clear above, the computing system environment 1200a is only one example of a suitable computing environment for a media device and is not intended to suggest any limitation as to the scope of use or functionality of the invention. Neither should the computing environment 1200a be interpreted as having any dependency or requirement relating to any one or combination of components illustrated in the exemplary operating environment 1200a.

With reference to FIG. 12, an exemplary remote device for implementing the invention includes a general purpose computing device in the form of a computer 1210a. Components of computer 1210a may include, but are not limited to, a processing unit 1220a, a system memory 1230a, and a system bus 1221a that couples various system components including the system memory to the processing unit 1220a. The system bus 1221a may be any of several types of bus structures including a memory bus or memory controller, a peripheral bus, and a local bus using any of a variety of bus architectures.

Computer 1210a typically includes a variety of computer readable media. Computer readable media can be any available media that can be accessed by computer 1210a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210a. Communication media typically embodies computer readable instructions, data structures, program modules or other data in a modulated data signal such as a carrier wave or other transport mechanism and includes any information delivery media.

The system memory 1230a may include computer storage media in the form of volatile and/or nonvolatile memory such as read only memory (ROM) and/or random access memory (RAM). A basic input/output system (BIOS), containing the basic routines that help to transfer information between elements within computer 1210a, such as during start-up, may be stored in memory 1230a. Memory 1230a typically also contains data and/or program modules that are immediately accessible to and/or presently being operated on by processing unit 1220a. By way of example, and not limitation, memory 1230a may also include an operating system, application programs, other program modules, and program data.

The computer 1210a may also include other removable/non-removable, volatile/nonvolatile computer storage media. For example, computer 1210a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221a through a non-removable memory interface such as an interface, and a magnetic disk drive or optical disk drive is typically connected to the system bus 1221a by a removable memory interface, such as an interface.

A user may enter commands and information into the computer 1210a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1220a through user input 1240a and associated interface(s) that are coupled to the system bus 1221a, but may be connected by other interface and bus structures, such as a parallel port, game port or a universal serial bus (USB). A graphics subsystem may also be connected to the system bus 1221a. A monitor or other type of display device is also connected to the system bus 1221a via an interface, such as output interface 1250a, which may in turn communicate with video memory. In addition to a monitor, computers may also include other peripheral output devices such as speakers and a printer, which may be connected through output interface 1250a.

The computer 1210a may operate in a networked or distributed environment using logical connections to one or more other remote computers, such as remote computer 1270a, which may in turn have media capabilities different from device 1210a. The remote computer 1270a may be a personal computer, a server, a router, a network PC, a peer device or other common network node, or any other remote media consumption or transmission device, and may include any or all of the elements described above relative to the computer 1210a. The logical connections depicted in FIG. 12 include a network 1271a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1210a is connected to the LAN 1271a through a network interface or adapter. When used in a WAN networking environment, the computer 1210a typically includes a communications component, such as a modem, or other means for establishing communications over the WAN, such as the Internet. A communications component, such as a modem, which may be internal or external, may be connected to the system bus 1221a via the user input interface of input 1240a, or other appropriate mechanism. In a networked environment, program modules depicted relative to the computer 1210a, or portions thereof, may be stored in a remote memory storage device. It will be appreciated that the network connections shown and described are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the systems and methods for representing and exchanging knowledge in accordance with the invention. The invention contemplates the use of the invention from the standpoint of an API (or other software object), as well as from a software or hardware object that performs the knowledge exchange in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to synchronize data with another computing device or system. For instance, the synchronization processes of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for representing and exchanging knowledge for a set of nodes in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A first node of a plurality of nodes connectable via one or more networks, comprising:
   a processor; and
   a memory component communicatively coupled to the processor, the memory component having stored therein computer-executable instructions that when executed by the processor cause the processor to implement
   a synchronization component configured to synchronize a set of objects between the first node and a second node of the plurality of nodes, including
      a synchronization communications component configured to initiate a synchronization with the second node, the synchronization component further configured to transmit to the second node first knowledge about the set of objects represented on the first node, wherein the synchronization communications component is further configured to receive a first subset of a first set of changes to the set of objects from the second node about which the first node does not know, and wherein the synchronization communications component is further configured to receive second knowledge about the set of objects represented on the second node, and
      a synchronization analysis component configured to update the set of objects represented on the first node and the first knowledge based on the first subset of the first set of changes, wherein the synchronization analysis component is further configured to compare the second knowledge with the first knowledge to determine a second subset of a second set of changes to the set of objects to send to the second node about which the second node does not know;
   at least one of a first filtered knowledge or a second filtered knowledge representing knowledge of respective subsets of information about the set of objects where the set of objects are represented on the first node with a first schema and represented on the second node with a second schema different from the first schema, wherein the first schema and the second schema have at least one overlapping schema element that can be synchronized as a subset; and filtered knowledge of the first node comprising an exception, representing a situation in which a different amount of information is known about an item or range of items than for a whole scope of items corresponding to the set of objects represented on the first node, the first node creating the exception in response to receiving partial knowledge from the second node.

2. The first node of claim 1, wherein a first filtered knowledge represents a first subset of information about the set of objects wherein no move operations are permitted in or out of the first subset.

3. The first node of claim 1, wherein a second filtered knowledge represents a second subset of information about the set of objects wherein no move operations are permitted in or out of the second subset.

4. The first node of claim 1, wherein at least one of a first filtered knowledge or a second filtered knowledge, if present, represents properties of the set of objects as a subset of information about the set of objects.

5. The first node of claim 1, the synchronization analysis component being further configured to determine whether a filtered subset of data received from the second node is strictly a subset corresponding to a filter of the first node, and if so, learn the filtered subset of data received from the second node.

6. The first node of claim 1, wherein the first node and the second node independently evolve the set of objects on the first node and the second node, respectively, when the first node or the second node disconnects from the one or more networks.

7. A method for synchronizing a set of objects between a first node and a second node of a plurality of nodes connectable via one or more networks, comprising employing a processor to execute computer executable instructions stored on a computer readable storage medium to implement the following acts:

initiating a synchronization by the first node with the second node including transmitting to the second node first knowledge of the first node concerning a set of objects represented on the first node;

receiving by the first node a first subset of a first set of changes, including at least a change with a schema element corresponding to the second node and a change with a schema element common to the first node and the second node, to the set of objects from the second node of which the first node is not aware based on a comparison of the first knowledge and a second knowledge of the second node concerning the set of objects;

representing a partial knowledge of the set of objects by the first node or the second node as a filtered version of at least one of the first knowledge or the second knowledge, equivalent to a subset of the set of objects, and having a scope corresponding to an intersection of elements between a first schema corresponding to the first node, and a second schema corresponding to the second node;

transmitting a second subset of a second set of changes to the set of objects from the first node of which the second node is unaware based on the comparison; and synchronizing the first node and the second node at least partly by applying at the first node the change in the first subset corresponding to the schema element common to the first node and the second node and consistent with the scope.

8. The method of claim 7, further comprising: synchronizing with a third node having a corresponding filtered version of third knowledge, and combining the filtered version of the first knowledge or the second knowledge, and the filtered version of the third knowledge, on a component-by-component basis.

9. The method of claim 7, further comprising:
restricting partial knowledge to when no move operations are permitted either in or out of the subset.

10. The method of claim 7, further comprising:
representing properties of the set of objects with partial knowledge of the set of objects.

11. The method of claim 7, further comprising representing partial knowledge by the first node when the first node and the second node have similar, but not identical, schemas.

12. The method of claim 7, further comprising:
applying the first subset of the first set of changes to the set of objects represented on the second node to bring the set of objects up to date as of a collective knowledge of the first node and the second node.

13. The method of claim 7, further comprising updating the first knowledge and corresponding versions represented on the first node based on the first subset of the first set of changes.

14. The method of claim 7, wherein the receiving includes receiving further changes representing knowledge of a first latest version of the set of objects from the second node of which the first node is not aware.

15. The method of claim 7,
wherein the initiating further comprises performing the synchronization by the first node or the second node with a third node by transmitting to the third node a third knowledge of the first node or second node concerning the set of objects represented on the first node or the second node, respectively.

16. The method of claim 7,
wherein the receiving further comprises receiving a third subset of changes from a third set of changes to the set of objects from a third node of which the first node or second node, respectively, is not aware based on a further comparison of a third knowledge of the third node concerning the set of objects represented on the third node and at least one of the first knowledge or the second knowledge; and
wherein the receiving further comprises receiving by the first node or the second node, respectively, from the third node the third knowledge.

17. The method of claim 7, further comprising:
comparing a third knowledge of a third node concerning the set of objects represented on the third node with at least one of the first knowledge or the second knowledge to determine what changes to the set of objects to send to the third node of which the third node is unaware.

18. The method of claim 7, further comprising:
detecting from at least one of the first knowledge or the second knowledge whether an object of the set of objects independently evolved on the first node or the second node.

19. A computing device configured to synchronize a subset of a set of objects between a first node and a second node of a plurality of nodes connectable via one or more networks, comprising:

a processor; and a memory component communicatively coupled to the processor, the memory component having stored therein computer-executable instructions that when executed by the processor cause the processor to implement
- a synchronization initiation component configured to initiate a synchronization between the first node and the second node,
- an input/output component configured to
  - output to the second node a first knowledge of the first node concerning the set of objects represented on the first node,
  - receive a first input representing a first subset of a first set of changes to the set of objects from the second node about which the first node does not have representation in the first knowledge of the first node, the first subset including at least a schema element maintained by the second node but not by the first node, and a schema element common to the first node and the second node, and
  - receive a second input representing a second knowledge of the second node concerning the set of objects represented on the second node, and
- a synchronization analysis component configured to
  - compare the second knowledge represented by the second input with the first knowledge of the first node to determine a second subset of a second set of changes to the set of objects to transmit to the second node not represented in the second knowledge of the second input, and
  - synchronize the first node with the second node at least partly by applying to the first node a change having the common schema element.

20. The computing device of claim 19, further comprising:

an authentication component configured to authenticate that the second node is permitted to synchronize with the first node.

* * * * *